United States Patent [19]

Takahashi et al.

[11] Patent Number: 5,407,146
[45] Date of Patent: Apr. 18, 1995

[54] PHOTOGRAPHIC FILM CASSETTE

[75] Inventors: Koichi Takahashi; Kazuo Okutsu; Masuhiko Hirose; Kazunori Mizuno, all of Kanagawa, Japan

[73] Assignee: Fuji Photo Film Co., Ltd., Kanagawa, Japan

[21] Appl. No.: 103,809

[22] Filed: Aug. 10, 1993

Related U.S. Application Data

[60] Division of Ser. No. 870,212, Apr. 17, 1992, Pat. No. 5,271,577, which is a continuation of Ser. No. 548,520, Jul. 5, 1990, abandoned.

[30] Foreign Application Priority Data

Jul. 4, 1989 [JP] Japan .................................. 1-172594
Jul. 4, 1989 [JP] Japan .................................. 1-172595

[51] Int. Cl.⁶ .............................................. G03B 17/26
[52] U.S. Cl. .................................. 242/348; 242/348.2
[58] Field of Search ..................... 242/71.1, 71.7, 71.8, 242/71.9, 71, 348.2, 348, 580; 354/275; 206/389, 409

[56] References Cited

U.S. PATENT DOCUMENTS

| | | |
|---|---|---|
| 1,469,018 | 9/1923 | Kingsbury . |
| 2,336,278 | 2/1942 | Mihalyi . |
| 2,360,255 | 10/1944 | Mihalyi . |
| 2,364,381 | 1/1942 | Mihalyi . |
| 2,521,932 | 9/1950 | Mihalyi et al. . |
| 2,552,200 | 2/1952 | Mihalyi . |
| 3,467,340 | 9/1969 | Rosenburgh . |
| 3,482,797 | 12/1969 | Riedel et al. . |
| 3,556,435 | 1/1971 | Wangerin . |
| 3,627,229 | 12/1971 | Wangerin . |
| 3,627,230 | 12/1971 | Wangerin . |
| 3,677,499 | 7/1972 | Wangerin . |
| 3,797,777 | 3/1974 | Hosono et al. . |
| 3,892,370 | 7/1975 | Nelson . |
| 3,894,700 | 7/1975 | Ito et al. . |
| 4,395,107 | 7/1983 | Lührig et al. .................. 354/275 |
| 4,407,579 | 10/1983 | Huff .................................. 354/275 |
| 4,423,943 | 1/1984 | Gold . |
| 4,744,527 | 5/1988 | Coote et al. ..................... 242/71.1 |
| 4,834,306 | 5/1989 | Robertson et al. .............. 242/71.1 |
| 4,846,418 | 7/1989 | Fairman ........................... 242/71.1 |
| 4,883,235 | 11/1989 | Niedospial, Jr. ................. 242/71.1 |
| 4,883,236 | 11/1989 | Niedospial, Jr. et al. ........ 242/71.1 |
| 4,887,776 | 12/1989 | Niedospial, Jr. et al. ........ 242/71.1 |
| 4,962,401 | 10/1990 | Takahashi . |
| 5,083,155 | 1/1992 | Kataoka et al. ................... 242/348 |
| 5,083,721 | 1/1992 | Okutsu et al. .................... 242/71.1 |
| 5,115,268 | 5/1992 | Kitagawa et al. .............. 242/71.1 X |
| 5,144,350 | 9/1992 | Takahashi et al. . |
| 5,174,519 | 12/1992 | Oi et al. ........................... 242/71.1 |
| 5,271,577 | 12/1993 | Takahashi et al. ................ 242/348 |

FOREIGN PATENT DOCUMENTS

| | | |
|---|---|---|
| 0091077 | 10/1983 | European Pat. Off. . |
| 0215928 | 12/1987 | European Pat. Off. . |
| 797075 | 4/1936 | France . |
| 2921379 | 11/1980 | Germany . |
| 1112349 | 5/1968 | United Kingdom . |
| 8001960 | 9/1980 | WIPO . |

Primary Examiner—Daniel P. Stodola
Assistant Examiner—John P. Darling
Attorney, Agent, or Firm—Sughrue, Mion, Zinn, Macpeak & Seas

[57] ABSTRACT

A film cassette assembly has a cassette and a roll of film wound on a spool and contained in the cassette. When the spool is rotated, the roll of film is rotated together with it in order to feed a film leader out of the cassette through a film passage mouth. To rotate the spool and the roll of film together, the film cassette assembly presses an axial end portion of the outermost periphery of the roll of film or presses the film's circumferential peripheral surface. Where the axial end portion of the outermost periphery of the roll of film is to be pressed, at least one of a pair of flanges of the spool is elastically deformed to clamp both axial side edges of the outermost periphery of the roll of film. Where the circumferential surface of the outermost periphery of the roll of film is to be pressed, a projection and an elastic member are provided within the cassette.

3 Claims, 11 Drawing Sheets

PHOTOGRAPHIC FILM CASSETTE

This is a divisional of application Ser. No. 07/870,212, filed Apr. 17, 1992, now U.S. Pat. No. 5,271,577, which is a continuation of prior application Ser. No. 07/548,820, filed Jul. 5, 1990, now abandoned.

BACKGROUND OF THE INVENTION

This invention relates to a photographic film cassette and more particularly to a photographic film cassette in which a film leader is fed out of a film passage mouth by means of the rotation of a spool around which a film is wound.

As it is well known in this technical field, a 35 mm-type photographic film cassette has a cylindrical cassette body including a film passage mouth, a spool rotatably contained in this cassette, and a 35 mm wide photographic film strip wound on this spool. In this type of 35 mm photographic film cassette, a leader of the photographic film strip (hereinafter simply referred to as the "film strip") is kept initially protruded from the film passage mouth so that, even if the spool should be rotated so as to be in a state such that the film leader is completely wound in the cassette, the roll of film strip would merely get loosened from the spool within the cassette and the film would not be fed out through the film passage mouth.

Conventional cameras using such a film cassette are designed to load a film automatically by taking advantage of the film leader withdrawn from the cassette. That is, when the cassette film is loaded in a camera, the film leader is caught by a film withdrawing mechanism, such as a sprocket, and is delivered into the film take-up chamber.

However, a beginner sometimes is inconvenienced by the initially protruded film leader when he or she is going to load a film cassette because, for instance, he or she often finds it difficult to set the leading end of the film to a predetermined position. Another problem is that when a camera requires a film withdrawing mechanism to be disposed between a cassette loading chamber and a film take-up chamber, its structure becomes complicated.

SUMMARY OF THE INVENTION

Therefore, it is a principal object of the present invention to provide a film cassette in which film loading can be accomplished without initially protruding a film leader from a cassette.

Another object of the invention is to provide a film cassette in which the structure of a camera can be simplified.

To achieve the above and other objects, the present invention includes apparatus for pressing an axial end portion of the outermost periphery or the circumferential peripheral surface of a film roll wound on a spool so as to rotate the film roll together with the spool when the spool is rotated so that a film leader can be fed out through a film passage mouth.

Where an axial end portion of the outermost periphery of the film roll is to be pressed, at least one of a pair of flanges of the spool is deformed elastically to clamp the end portion of the outermost periphery of the film roll. Where the circumferential peripheral surface of the outermost periphery of the film roll is to be pressed, a projection or an elastic member is provided within a cassette for performing the pressing operation.

In the invention film cassette, as the roll is rotated together with the spool, the film leader can be fed out through the film passage mouth. Also, as the film leader is not initially protruded from the cassette, handling becomes easier and a beginner will not be inconvenienced when the film cassette is loaded in a camera. Furthermore, no film leader feed mechanism is necessary in the camera.

BRIEF DESCRIPTION OF THE DRAWINGS

The above and other objects, features and advantages of the present invention will become more apparent, and the invention itself will best be understood, from a study of the following description and appended claims, with reference to the attached drawings showing some preferred embodiments of the invention, wherein:

DETAILED DESCRIPTION OF THE PREFERRED EMBODIMENTS

Figure 1:
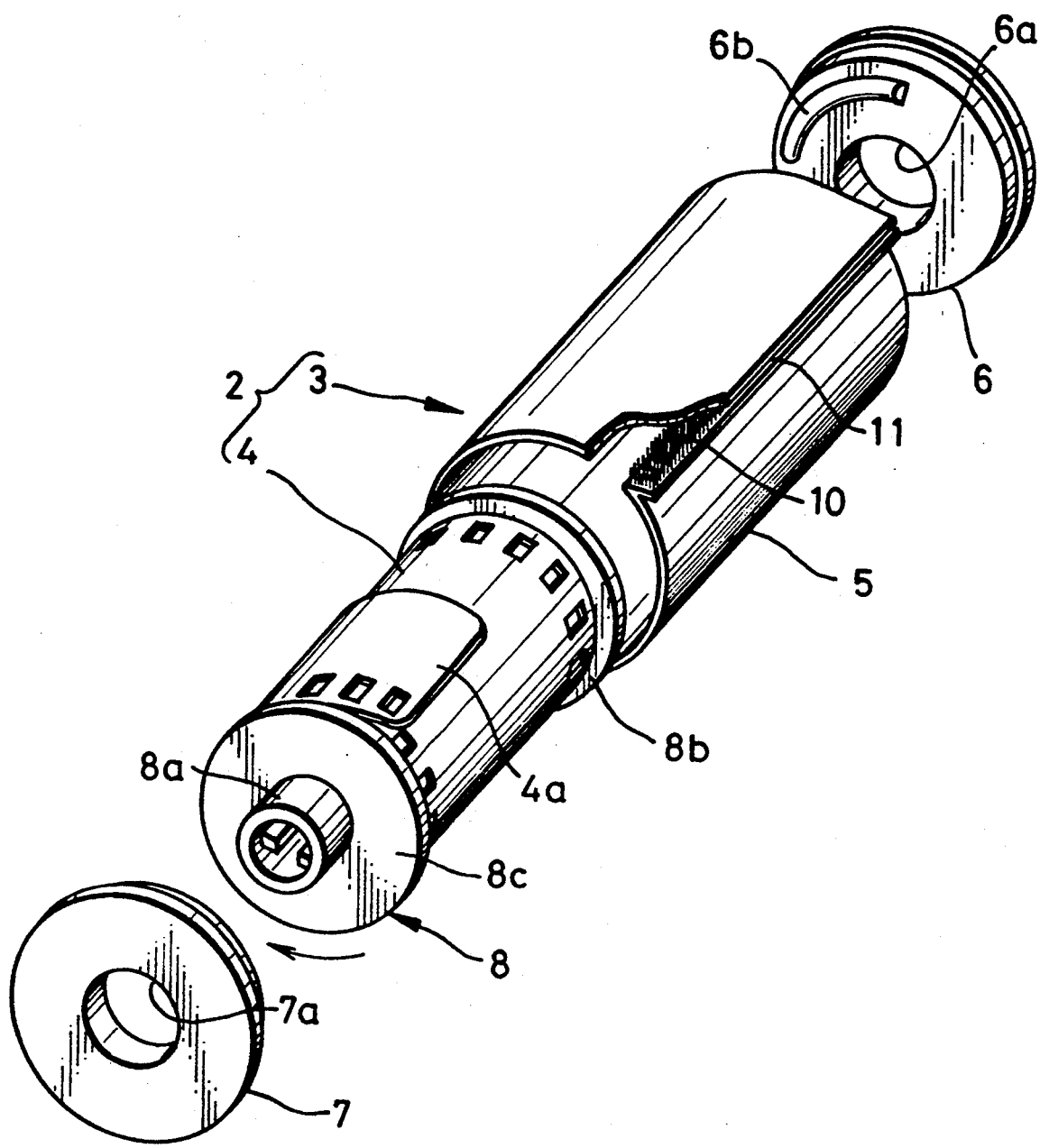
FIG. 1 is an exploded perspective view showing one embodiment of the invention, in which a roll of film is clamped by elastically deforming one of a pair of flanges with a ridge formed on a side plate.

In FIG. 1 showing a first embodiment of the invention, a film cassette 2 includes a roll of film 4, and a cassette 3 for containing the roll of film 4 in a light-tight manner. That is, light is not permitted to reach the roll of film 4. This cassette 3 includes a cylindrical cassette body 5, a pair of side plates 6 and 7 adapted to engage the cassette body 5 in a light-tight manner, and a spool 8. The component parts preferably are molded from plastic material. The cassette body 5 is provided with a film passage mouth 11 with a plush 10 attached thereto for light shielding purposes.

The spool 8 is constituted by a spool shaft 8a and a pair of flanges 8b and 8c, and is integrally molded from plastic material. One flange 8b is made thin so that it may have elasticity, and the other flange 8c is made sufficiently thick so as not to be deformed. The distance between the pair of flanges 8b and 8c is slightly greater than the width of a film strip. The roll of film 4, as well known includes, a film strip having its back surface disposed outside and its silver halide emulsion surface disposed inside, and is wound on the spool shaft 8a. The film leader 4a also is hidden in the cassette body 5 before the cassette is loaded into a camera (not shown). A rear end of the film strip is secured to the spool shaft 8a as in the case of the conventional 35 mm-type film cassette.

The side plate 6 is provided at its central portion with an opening 6a adapted to support rotatably one end portion of the spool shaft 8a, and its inner wall surface is provided with an arcuate ridge 6b adapted to press a part of the spool flange 8b. Likewise, the side plate 7 is provided at its central portion with an opening 7a adapted to support rotatably the other end of the spool shaft 8a. Also, there is provided a ring-like ridge 7b on the inner wall surface of side plate 7 (see FIG. 2) in order to reduce friction between the inner wall surface of the side plate 7 and the flange 8c. One side plate may be molded integrally together with the cassette body 5. The cassette also may be designed such that the cassette body 5 is divided into two parts and this half cassette is formed so as to be integral with a half-circular side plate.

Figure 2:
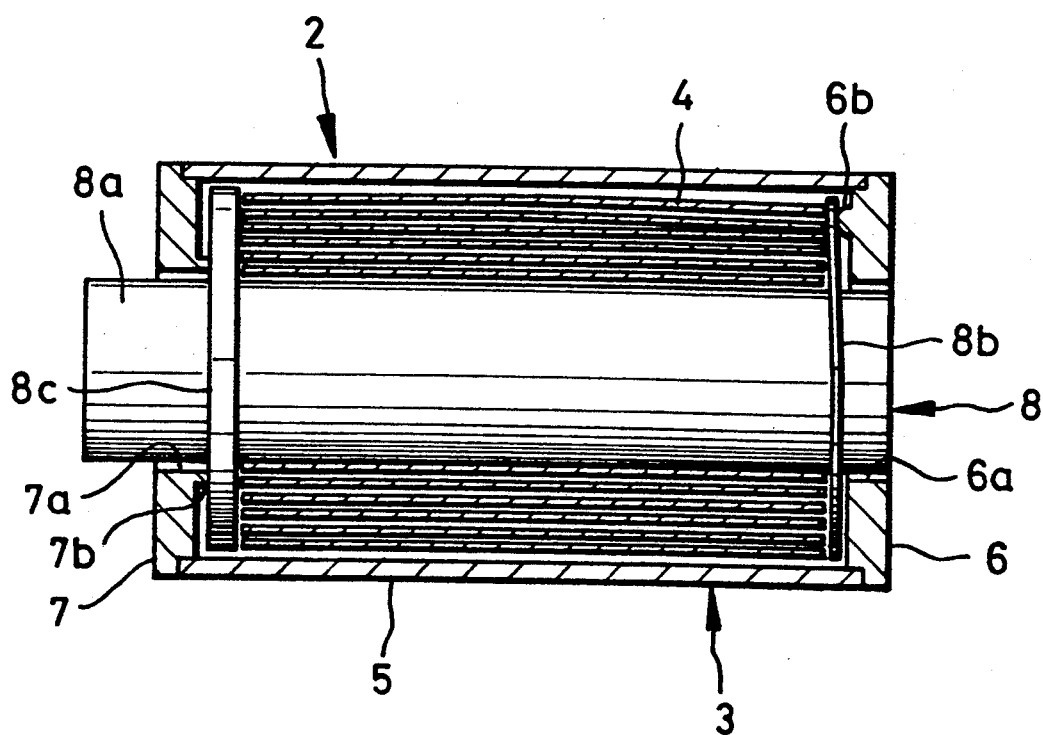
FIG. 2 is a vertical sectional view of a film cassette shown in FIG. 1.

In FIG. 2, as the distance between the ridge 6b and the ridge 7b is shorter than the distance between the spool flanges 8b and 8c, the flange 8b is elastically deformed due to the urging of the ridge 6b. By this, an end face of the roll of film 4 is clamped more firmly between the spool flanges 8b and 8c at its outer side near the cassette body 5 than at its inner side near the spool shaft 8a.

The film cassette 2 of the present embodiment is to be loaded in the camera in a condition such that even the film leader 4a is wound inside the cassette 3. When the spool 8 is rotated, by a mechanism of the camera, in the direction as indicated by the arrow in FIG. 1, the roll of film 4 is rotated together with the spool 8 due to the friction between the flanges 8b and 8c and the side end faces of the outer sides of the roll of film 4 so as to feed the film leader 4a outside the cassette body 5 from the film passage mouth 11. The film leader 4a is fed toward and caught by a take-up spool of the camera as is well known.

Since the roll of film 4 is clamped between the pair of flanges 8b and 8c, it can also be prevented from getting loosened, and as a result inconveniences, such as the vertically overlapped portions of the film strip rubbing against each other to generate scratches due to vibrations during transportation, or the film strip rubbing against the inner wall of the cassette body 5, may be prevented.

Also, the distance between the ridge 6b and the ridge 7b can be made longer than the distance between the flanges 8b and 8c. In that case, a push member is provided in the camera and the spool 8 is pushed rightwards in FIG. 2 to press the flange 8b against the ridge 6b so as to cause the flange 8b to become elastically deformed. Due to the elastic deformation of the flange 8b, both side edges of the outer sides of the roll of film 4 can be clamped with the pair of flanges 8b and 8c as previously mentioned.

Figure 3:
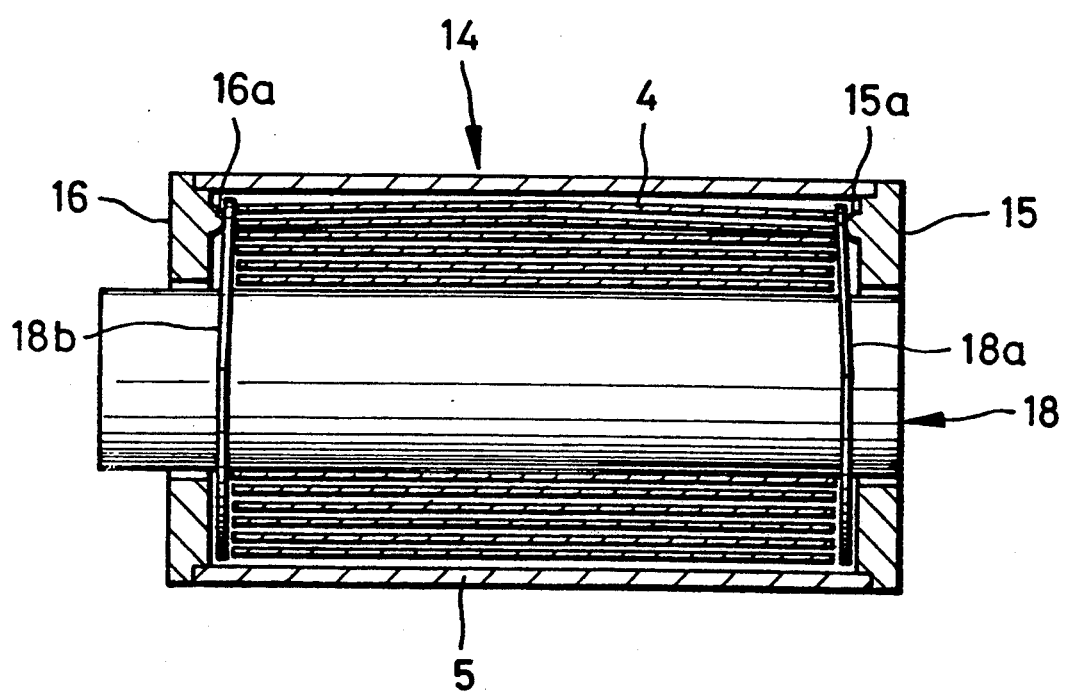
FIG. 3 is a vertical sectional view showing a modified embodiment of the invention, in which both flanges are deformed elastically.

FIG. 3 illustrates a second embodiment of the invention, and like components shown in FIGS. 1 and 2 are represented by the same reference numerals. In a film cassette 14 of this embodiment, side plates 15 and 16 are provided with the same ridges 15a and 16a as in the first embodiment, and both flanges 18a and 18b are formed thin so that they may have elasticity. With the film cassette 14 of the construction as mentioned, the flanges 18a and 18b are urged so as to be deformed elastically by the ridge portions 15a and 16a so as to clamp both side edges of the outer sides of the film roll 4. Accordingly, it is possible to obtain the same effect as in the first embodiment.

Figure 4:
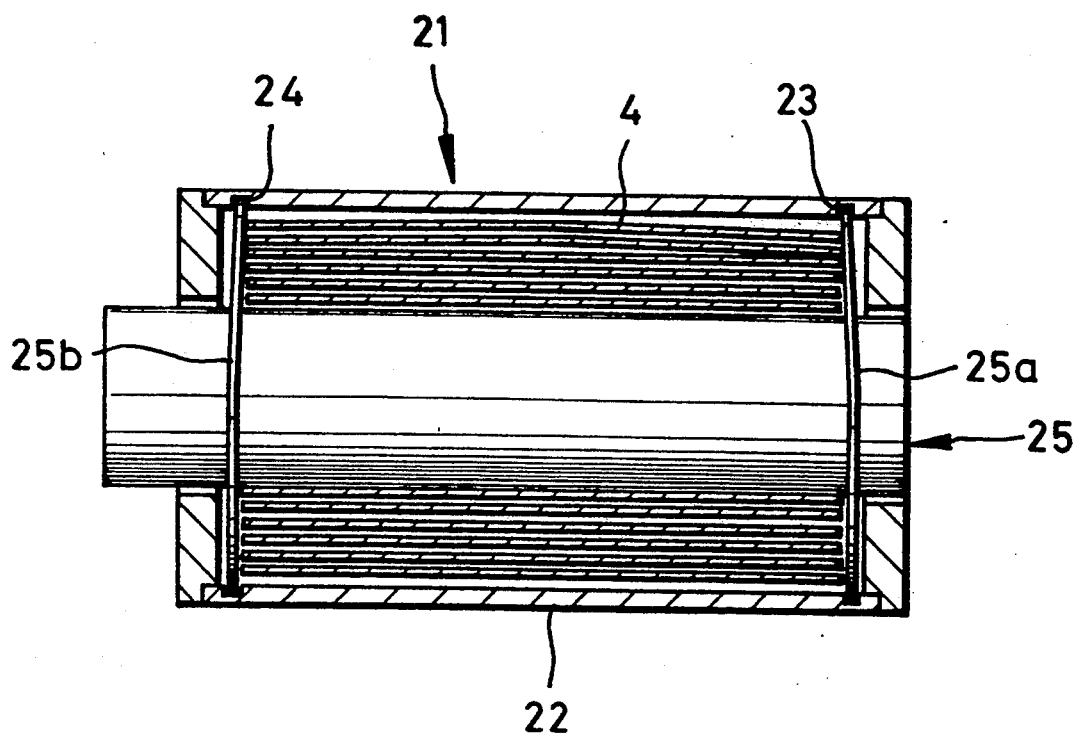
FIG. 4 is a vertical sectional view showing another modified embodiment of the invention in which the flanges are deformed elastically by having both flanges engaged in grooves formed in a cassette body.

FIG. 4 illustrates a third embodiment of the invention. In a film cassette 21 of this embodiment, a cassette body 22 is provided with grooves 23 and 24 formed at its inner sides, and a pair of flanges 25a and 25b of a spool 25 are loosely engaged therein. As the distance between the grooves 23 and 24 is slightly smaller than the width of the film strip, the peripheral edge portions of the flanges 25a and 25b are deformed elastically toward each other. Accordingly, both side edges of the outer periphery of the roll of film 4 are clamped between the pair of flanges 25a and 25b.

Figure 5:
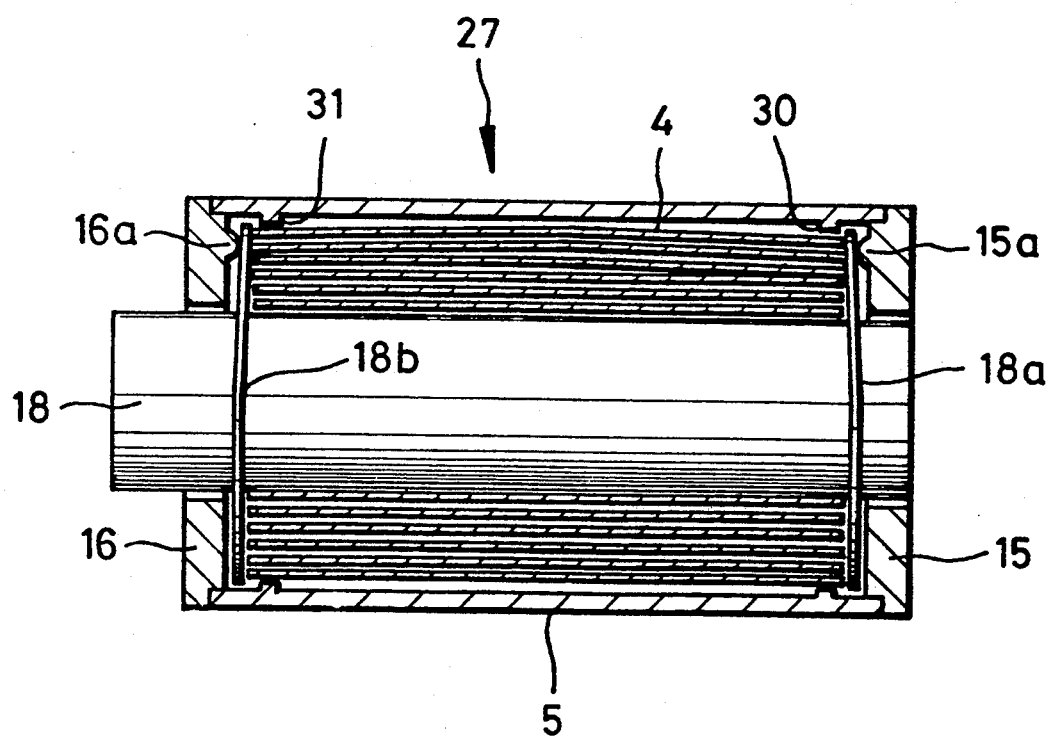
FIG. 5 is a vertical sectional view of another embodiment of the invention which includes ridges adapted to position a roll of film.

FIG. 5 illustrates an improved embodiment of the film cassette of FIG. 3, and like component parts of FIG. 3 are represented by the same reference numerals. In this film cassette 27, ring-like projections 30 and 31 are formed on the inner sides of the cassette body 5. These projections 30 and 31 project into a space between the pair of flanges 18a and 18b. Due to this arrangement, the film strip is prevented from entering a space between the flange 18a and 18b and the inner wall of the cassette body 5 by climbing over the flange 18a and 18b. Of course, as these projections 30 and 31 press the outermost peripheral surface of the roll of film 4, the film can be fed out more surely as compared to the case where the roll of film 4 is clamped between only flanges 18a and 18b.

Figure 6:
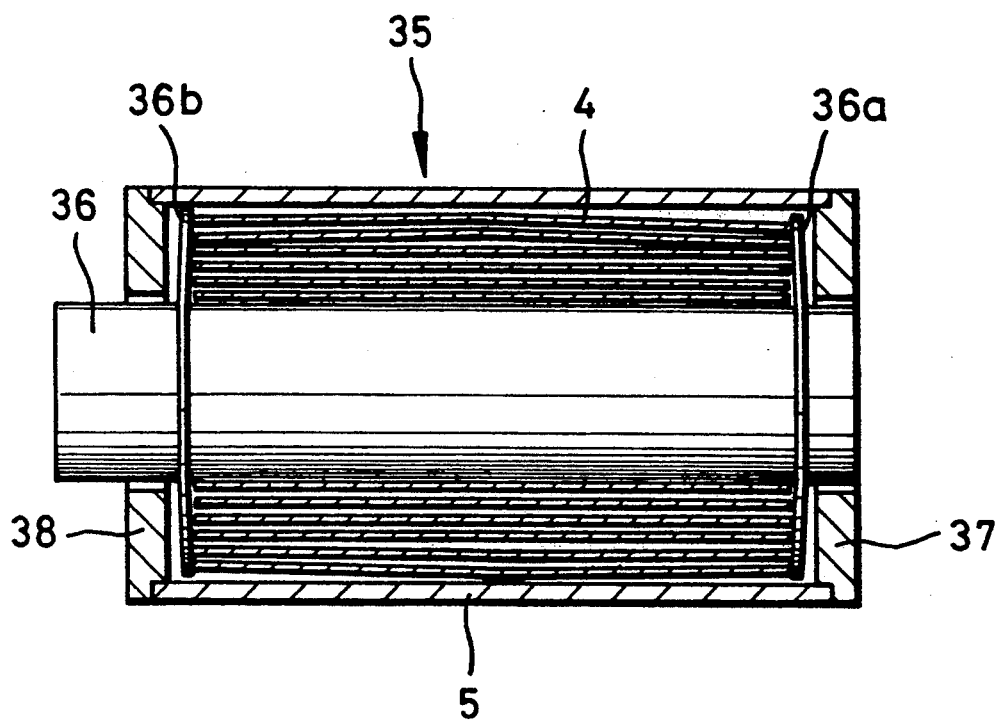
FIG. 6 is a vertical sectional view of still another embodiment which includes a spool having a pair of deformed flanges.

FIG. 6 illustrates a fifth embodiment of the invention. A spool 36 of a film cassette 35 has a pair of deformable flanges 36a and 36b, which are designed such that both the outer peripheral edges thereof are curved inwardly so that the distance between the outer peripheral edges is shorter than the width of the film strip. Due to this arrangement, as both the side edges of the outermost periphery of the roll of film 4 are clamped from both sides by the flanges 36a and 36b, the same effect as the first embodiment can be obtained. Although both the flanges 36a and 36b are inclined in this embodiment, only one of them may be inclined. The reference numerals 37 and 38 denote a pair of side plates.

Figure 7:
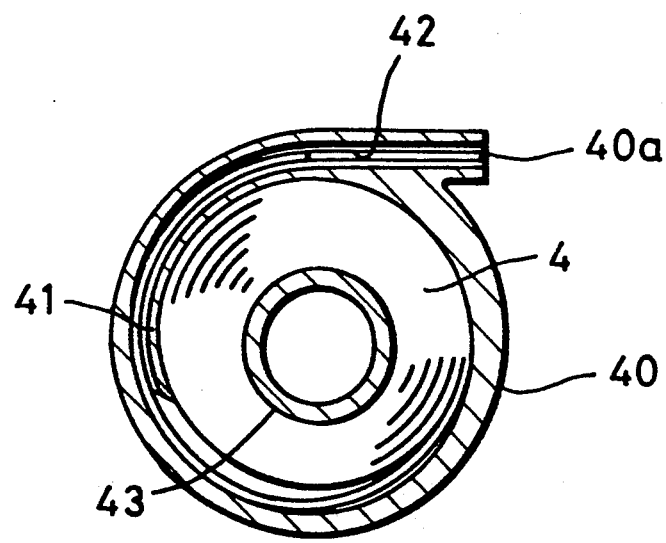
FIG. 7 is a sectional view showing yet another embodiment of the invention in which an arcuate guide passage is formed in the cassette body.
Figure 8:
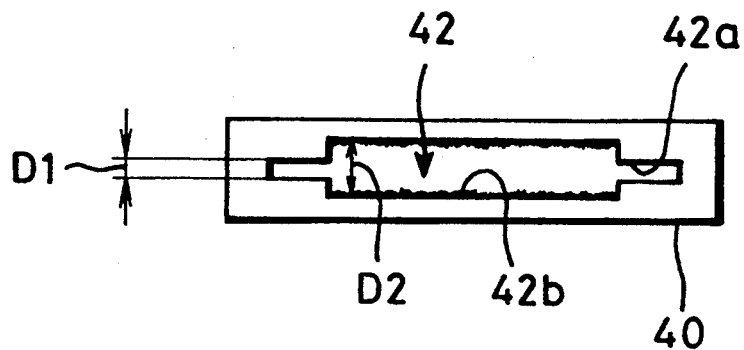
FIG. 8 is an end view showing a film passage mouth for the film cassette of FIG. 7.

FIGS. 7 and 8 illustrate another embodiment in which a guide passage is formed within the cassette body. Within the cassette body 40, an arcuate guide element 41 is integrally formed. By this guide element 41, an arcuate guide passage 42 communicating with a film passage mouth 40a is defined. This cassette body 40 contains therein, in a light-tight fashion, a spool 43 having the same construction as that of the spool 36 shown in FIG. 6. The roll of film 4 is wound on the spool 43 and a pair of side plates are engaged with the cassette body 40. The guide element 41 is formed on the cassette body 40 in such a way that it enters a space between a pair of flanges. The film cassette may be designed such that, as shown in FIG. 3, the side plates are provided with ridges so as to elastically deform the flanges.

The guide passage 42, as shown in the illustration of FIG. 8 in which the guide passage 42 is seen from the film passage mouth 40a, is constituted by a wide passage 42b and narrow passages 42a disposed at both sides thereof. When the film strip is ejected out of the cassette the narrow passages 42a contact both side edges of the film strip. As the wide passage 42b does not contact the film strip, the back surface and silver halide emulsion surface thereof do not suffer from scratches. Also, the outer surface of the wide passage 42b is a slightly uneven mat surface, for improving the light shielding ability of the film cassette. As light entering from the film passage mouth 40a proceeds while being refracted, it is attenuated and will never expose the roll of film 4.

In this embodiment, as the outer side of the roll of film 4 is clamped at both side edges thereof between the pair of flanges, when the roll of film 4 is rotated together with the spool 43, the film leader is fed out from the film passage mouth 40a via the guide passage 42. If the leading end portion of the guide element 41 is made thin in order to provide elasticity and the outermost peripheral surface of the roll of film 4 is pushed with this leading end portion, the film leader can be fed out more surely. Also, if the film leader is stopped within the guide passage 42, it will improve the reliability of the film feeding action. Also, in order to improve the light shielding ability of the guide passage 42 further, it is preferable that the base of the film strip be dyed with a dye having an opacifying ability, or that knurling is applied to one or two frame portions of the film strip from the film leader. Also, to improve the light shielding ability, it is preferable that the width D1 of the narrow passage be 0.2mm or more, the width D2 of the wide passage 42b be 0.8 mm or less, and the length of the guide passage 42 be 5 mm or more.

Figure 9:
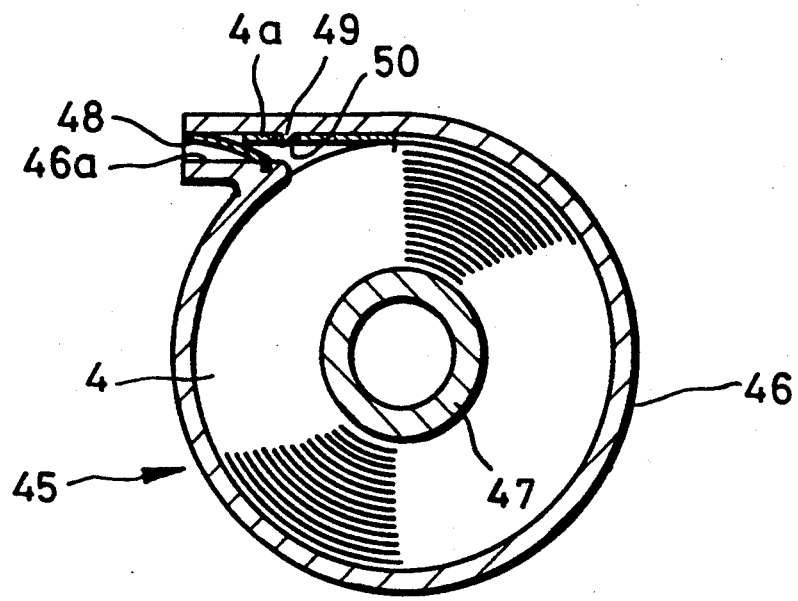
FIG. 9 is a sectional side view showing another embodiment of the invention which includes a retaining claw for retaining the film leader.

FIG. 9 depicts a film cassette 45 adapted to retain the film leader in the vicinity of the film passage mouth. The cassette body 46 rotatably contains therein the same spool 47 as the embodiment of FIG. 6. In the vicinity of the film passage mouth 46a, a light shielding plate 48 having elasticity and an engaging claw 49 adapted to be engaged with a hole 50 formed on the side of a leading end of the film leader 4a are provided in order to prevent the film leader 4a from being withdrawn into the cassette body 46. This light shielding plate 48 is formed of, for example, a thin metal plate having elasticity, a plastic film properly dyed to have a light shielding ability, a plastic film with metallic foils attached thereto, a plastic film with a metal deposition, a laminated material formed of a combination of these materials, etc.

Figure 10:
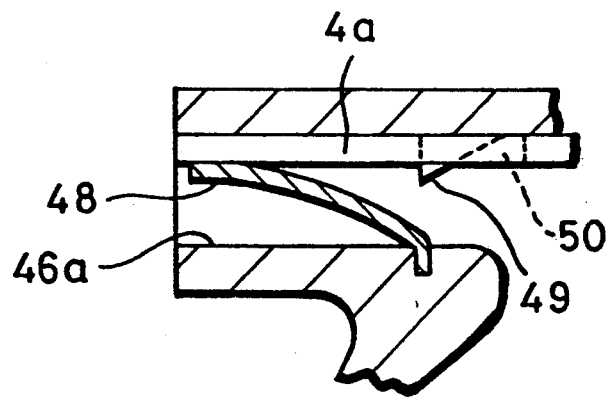
FIG. 10 is an enlarged sectional side view of the nearby area of the film passage mouth of FIG. 9, which is improved such that the film leader is pressed with a light shielding plate.

By virtue of the provision of this light shielding plate 48, there can be realized a film passage mouth structure having a favorable light shielding ability while maintaining the severely limited feeding resistance. As a result, the reliability of the film feeding operation which is performed in accordance with rotation of the spool can be improved. It also is possible to design the film cassette so that the film leader 4a is held in the film passage mouth 46a by pressing the film leader 4a with a light shielding element and thus do away with the retaining claw 49. Also, as shown in FIG. 10, if the film leader 4a is retained in a state where an end portion of the film leader 4a is held between the light shielding plate 48 and the inner wall of the film passage mouth 46a, the reliability of the film feeding operation can be improved further.

Figure 11:
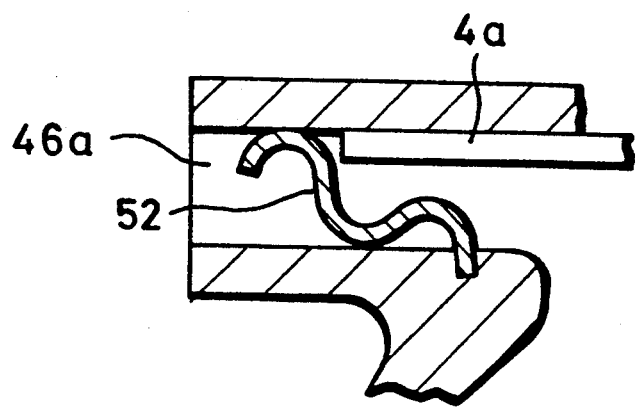
FIGS. 11 through 13 are views similar to FIG. 10, in which embodiments of the light shielding plate are shown, respectively.
Figure 12:
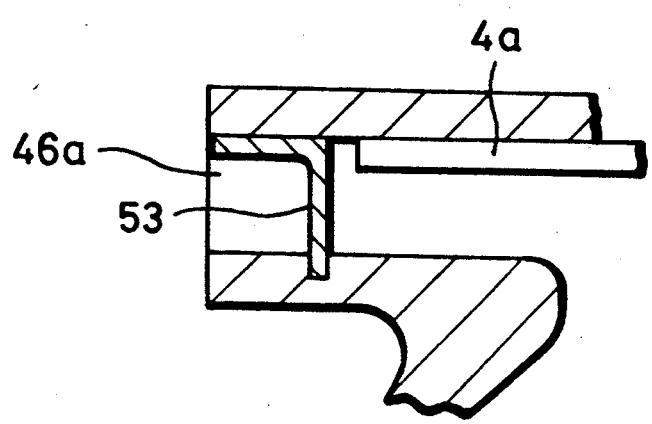
Figure 13:
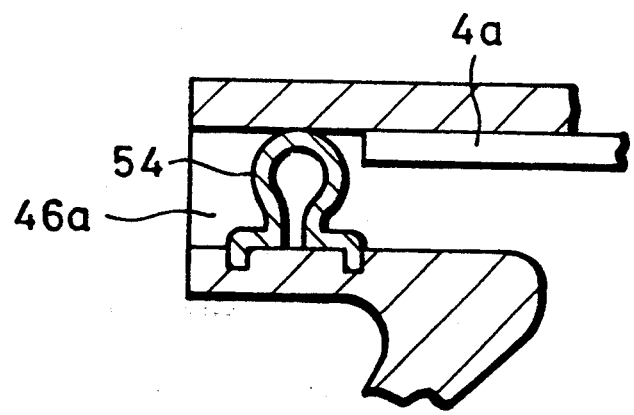

FIGS. 11 through 13 depict modified embodiments of the light shielding plates, respectively. FIG. 11 shows an S-shaped light shielding plate 52, FIG. 12 shows and L-shaped light shielding plate 53, and Fig. 13 shows an Ω-shaped light shielding plate 54.

The elastic spool flange may be made thinner toward its tip instead of being formed of a uniform thickness. Furthermore, the configuration of the flange is not limited only to a disk shape. It may be formed into a triangular shape having the thickest portion at its center, or otherwise it may be provided with a cut or a notch to provide an increased elasticity.

To facilitate easy feeding of the film strip, it is preferable to increase the friction between the inner side of the flange and the side end face of the roll of film. This can be achieved by providing a rough inner surface of the flange, by applying a pear-skin pattern, by forming irregularities on the inner surface, or by forming a friction resistant inner surface. It is preferable that the friction resistance between the ridge 6b and the outer surface of the flange 8b be small. To this end, a lubricant layer is provided to both or a selected one of the flange 8b and the ridge 6b. Also, it is preferable that both a part of the outer surface of the flange and the ridge, or a selected one of them be made of resin or metallic material which is slippery.

Figure 14:
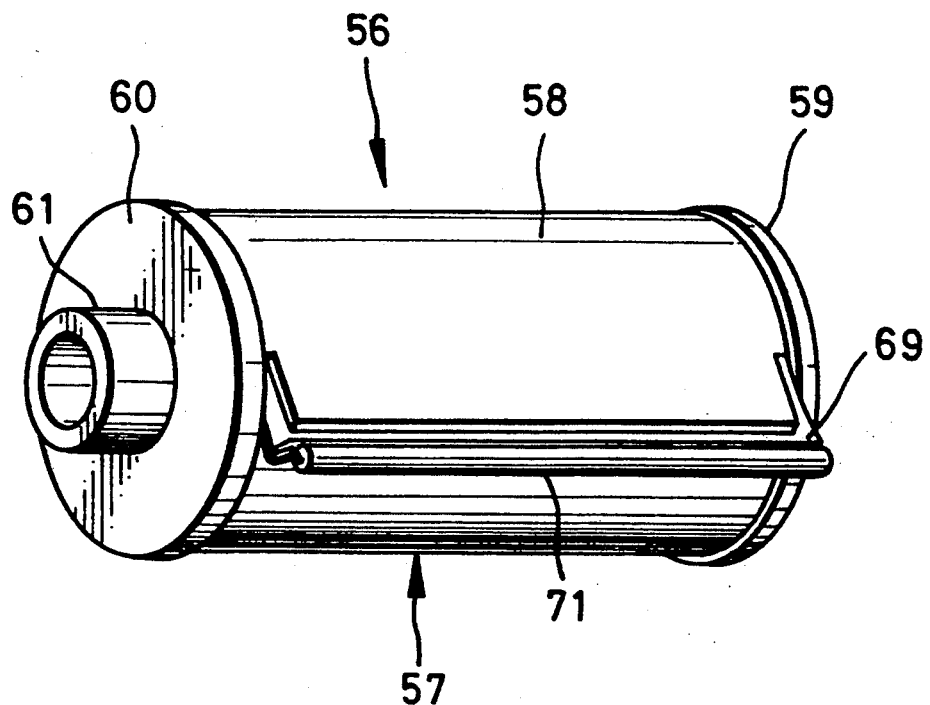
FIG. 14 is a perspective view showing another embodiment of the invention in which the outermost peripheral surface of the roll of film is pressed with an elastic member.
Figure 15:
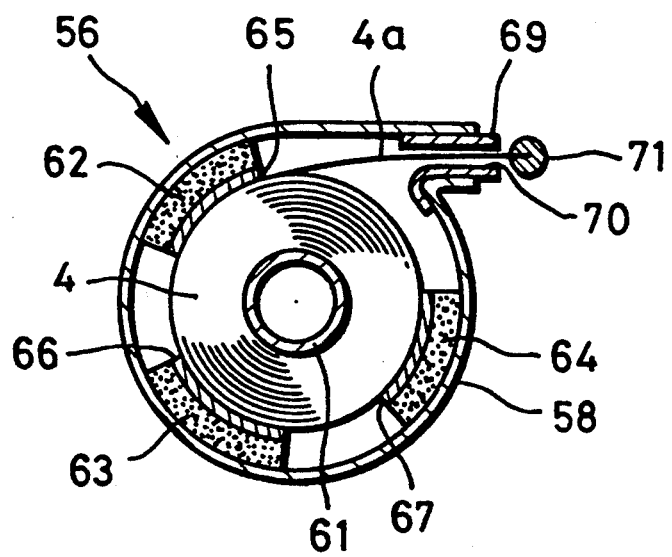
FIG. 15 is a sectional side view of the film cassette of FIG. 14
Figure 16:
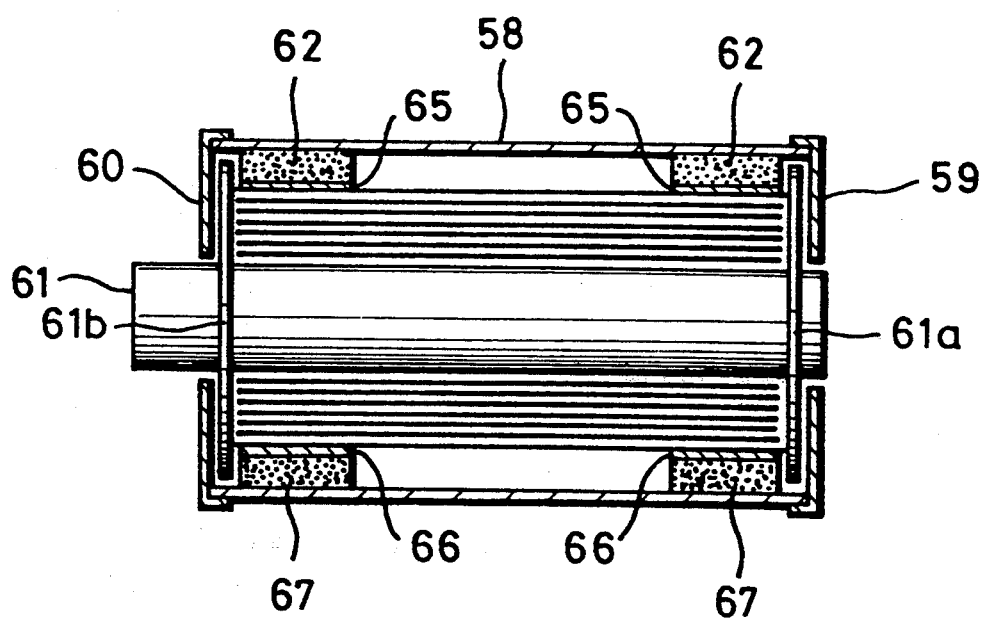
FIG. 16 is a vertical sectional view of the film cassette of FIG. 14.

FIGS. 14 through 16 illustrate another embodiment in which the outermost peripheral surface of the roll of film is pressed toward the center line of the roll of film. The film cassette assembly 56 comprises a cassette 57 and a roll of film 4. The cassette 57 comprises a cylindrical cassette body 58, a pair of side plates 59 and 60 adapted to engage with both side edges of the cylindrical cassette body 58 form outside in a light-tight manner, and a spool 61 with the roll of film 4 wound on it. The cassette body 58 is provided with elastic members 62 through 64 formed of, for instance, rubber and sponge, mounted on the inner wall thereof in such a manner as to occupy a space between a pair of flanges 61a and 61b of the spool 61 and adapted to urge the outermost peripheral surface of the roll of film 4 toward the center of the shaft of the spool 61 from three directions. These elastic members 62 through 64 are provided on surfaces, which contact the roll of film 4, with lubricant layers 65 through 67 using, for instance, lubricant or a tape having a lubricant surface. Also, the cassette body 58 is provided with a film passage mouth 70 with a light shielding plush 69 attached thereto. The roll of film 4 has a film trailer (not shown) secured to the spool 61 and a rod-like stopper 71 mounted on the film leader 4a. By virtue of the provision of this stopper 71, the film leader 4a is prevented from being taken into the cassette body 58.

Material for the lubricant layers 65 through 67 are selected so that, when the coefficient of friction between the back surface of the film strip and the lubricant layers 65 through 67 which contact the back surface is represented by $\mu1$, and the coefficient of friction between the back surface of the film strip 4 and the silver halide emulsion surface by $\mu2$, a condition $\mu1 \leq \mu2$ is satisfied. By satisfying this conditional expression, the rerotational force of the spool 61 is surely transmitted to the film leader 4a. Therefore, by rotating the spool 61 in the feeding direction (clockwise in FIG. 15), the film leader 4a can be fed outside the cassette body 58 from the film passage mouth 70.

Figure 17:
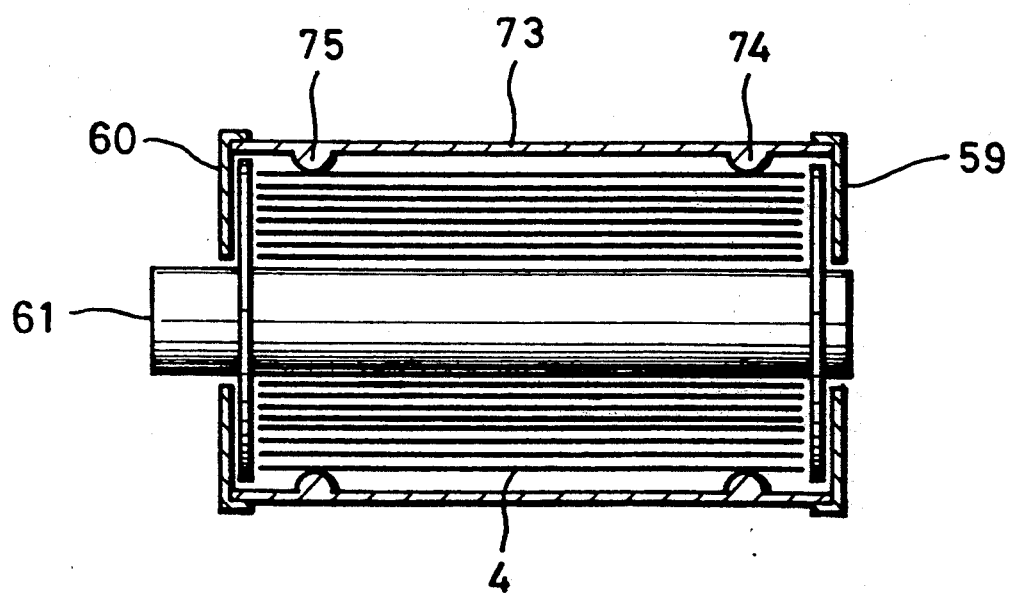
FIG. 17 is a vertical sectional view showing another embodiment of the invention in which the cassette body is provided with ring-like ridges.

FIG. 17 depicts another embodiment in which the inner wall of a cassette body 73 is provided with a pair of ring-like projections 74 and 75, and like component parts of the embodiment of FIG. 14 through 16 are represented by the same reference materials. The coefficient of friction $\mu1$ between the projections 74 and 75 and the film base is smaller than the coefficient of friction $\mu2$ between the upper and lower surfaces of the film strip 4. In this embodiment, since the outermost peripheral surface of the roll of film 4 is pressed by the projections 74 and 75, the film leader is fed out upon rotation of the spool 61.

Figure 18:
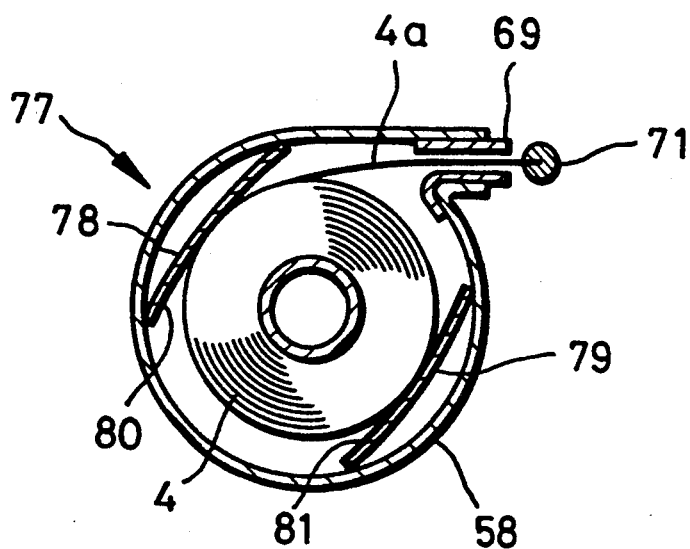
FIG. 18 is a sectional side view showing another embodiment of the invention in which the cassette body is provided with elastic plates.
Figure 19:
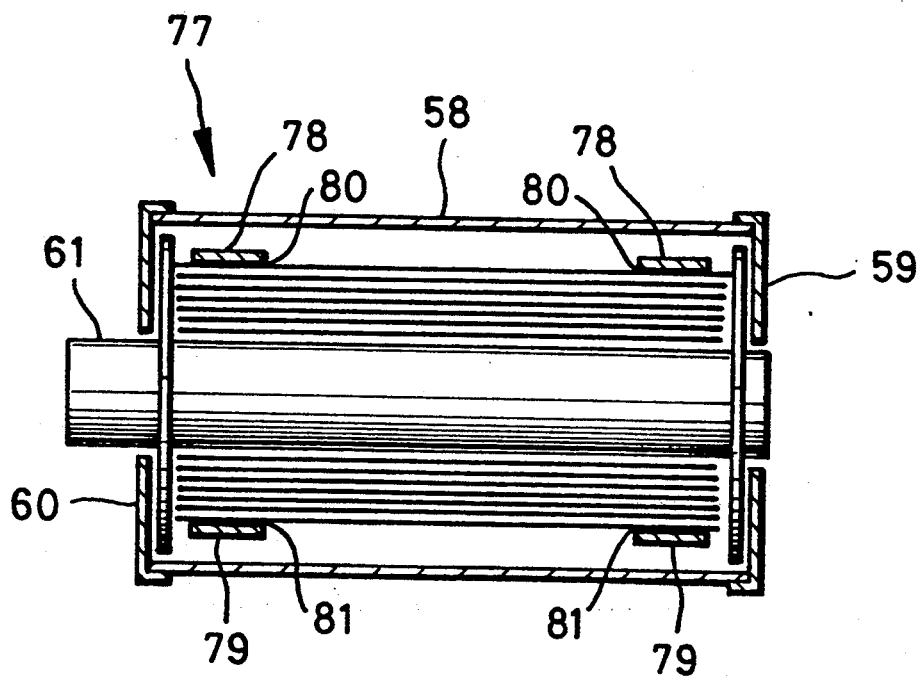
FIG. 19 is a vertical sectional view of the film cassette of FIG. 18.

A film cassette 77 depicted in FIGS. 18 and 19 is constituted by a cassette body 58, and a pair of elastic plates 78 and 79 disposed within the cassette body 58, the plates 78 and 79 being adapted to press the outermost peripheral surface of a roll of film 4. These elastic plates 78 and 79 are provided on their outer surfaces with lubricant layers 80 and 81. Generally, identical component parts of FIGS. 14 through 16 are represented by identical reference numerals.

To confirm the effect of the embodiment for pressing the outermost peripheral surface of the roll of film 4, sample Nos. 1 through 5 were prepared and the spool was rotated under the conditions 1 through 3 in the feeding direction. The feeding operation of the film leader 4a was checked.

CONDITION 1: IMMEDIATELY AFTER MANUFACTURE;
CONDITION 2: THREE DAYS AFTER MANUFACTURE IN A STATE WHERE THE SAMPLES WERE DRIED AT 60° C. AFTER BEING MANUFACTURED; AND
CONDITION 3: THREE DAYS AFTER MANUFACTURE IN A STATE WHERE THE SAMPLES WERE SUBJECTED TO A TEMPERATURE OF 40° C. AND 80% HUMIDITY AFTER BEING MANUFACTURED.

Sample No. 1 is a film cassette having the construction as shown in FIGS. 14 through 16. For elastic members 62 through 64, a polyurethane of 3 mm thickness and 50% compression ratio (when pressed with 50 g/cm$^2$) was used. By attaching a Mending Tape 810 (merchandise name) available from Sumitomo 3M Ltd., Japan to the outer surfaces of the elastic members 62 through 64, the lubricant layers 65 through 67 were formed. A color negative film Super HR-100 (merchandise name) which is manufactured by FUJI PHOTO FILM CO., LTD. was used for a film strip.

Sample No. 2 has the same construction as the sample No. 1. An X-ray Film #80 (merchandise name of an X-ray film using a polyester base of 80 $\mu$m thickness) manufactured by FUJI PHOTO FILM CO., LTD. was used for a film strip.

Sample No. 3 is a film cassette having the construction as shown in FIGS. 18 and 19. The elastic plates 78 and 79 were formed of silicon manganese steel of 0.1 mm thickness and the Mending Tape 810 was used for the lubricant layers 80 and 81. Super HR-100 was used for a film strip.

Sample No. 4 has the same construction as Sample No. 3, but the X-ray film #80 was used for a film strip.

Sample No. 5 has almost the same construction as Sample No. 1. However, in order to prevent the film leader from being fed out by the rotation of the spool during transportation, etc., the edges of openings of bearings of the side plates 59 and 60 and the spool 61 are attached together temporarily with an adhesive agent.

A comparison Sample No. 6 is for comparison with the present invention and has the same construction as Sample No. 1 only excluding the elastic members 62 through 64. A comparison Sample No. 7 has the same construction as Sample No. 3, only excluding the lubricant layer.

TABLE 1

| | Feed out | Feeding torque (g · cm) | Coefficient of friction $\mu2$ condition | | | Coefficient of friction $\mu1$ condition | | |
| --- | --- | --- | --- | --- | --- | --- | --- | --- |
| | | | 1 | 2 | 3 | 1 | 2 | 3 |
| Sample No. 1 | O | 80 | 0.48 | 0.50 | 0.70 | 0.42 | 0.42 | 0.60 |
| Sample No. 2 | O | 70 | 0.71 | 0.72 | 0.95 | 0.54 | 0.58 | 0.69 |
| Sample No. 3 | O | 150 | 0.48 | 0.50 | 0.70 | 0.42 | 0.44 | 0.58 |
| Sample No. 4 | O | 120 | 0.71 | 0.72 | 0.95 | 0.54 | 0.58 | 0.70 |
| Sample No. 5 | O | 320 | | | | | | |
| Comparison sample No. 1 | X | | | | | | | |
| Comparison sample No. 2 | X | | 0.52 | 0.55 | 0.70 | 0.72 | 0.73 | 0.95 |

The coefficients of friction $\mu1$ and $\mu2$ were measured with a HEIDON-1D (merchandise name) available from Shinto Scientific Co., Ltd. The symbolic mark O indicates that the film leader can be fed out, while X indicates that the film leader cannot be fed out. As apparent from Table 1, Sample Nos. 1 through 5 could feed out the film leader from the film passage mouth by means of rotation of the spool. Any one of them satisfies the expression $\mu 1 \leqq \mu 2$. In this way, as the film leader can be fed out by means of rotation of the spool, the film withdrawing mechanism of a camera can be omitted. Furthermore, as the film leader can be contained within the cassette body, it becomes easy to handle the film cassette and to load it into a camera.

Figure 20:
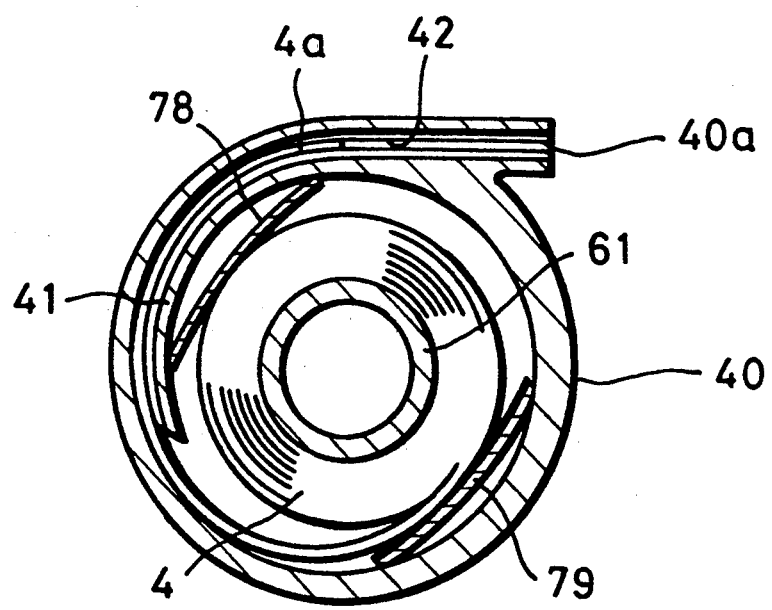
FIG. 20 is a sectional side view showing another embodiment of the invention in which elastic plates are disposed within the cassette body which includes a guide passage.

Another embodiment shown in FIG. 20 employs the cassette body 40 including the guide passage 42 as shown in FIGS. 7 and 8. Elastic plates 78 and 79 additionally are provided therein in order to press the outermost peripheral surface of the roll of film 4.

Figure 21:
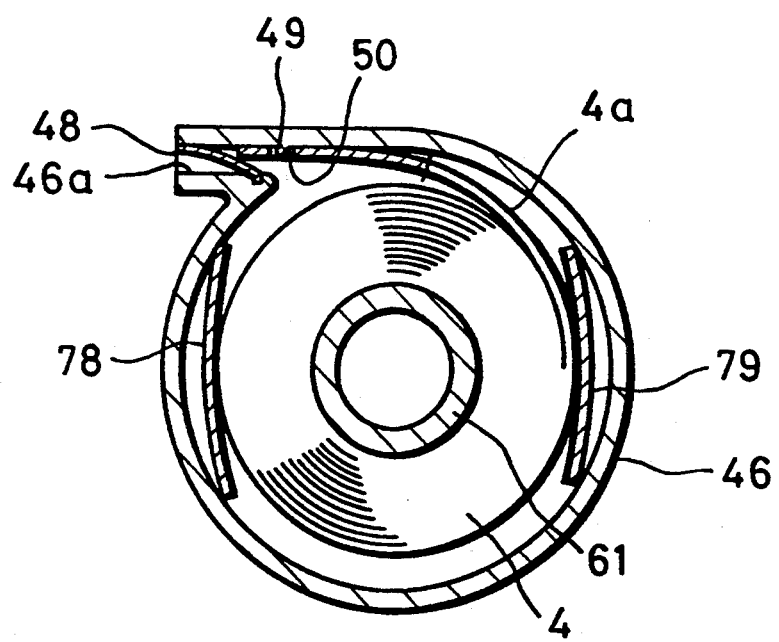
FIG. 21 is a sectional side view showing another embodiment of the invention in which elastic plates are disposed within the cassette body which includes a retaining claw.

Another embodiment shown in FIG. 21 employs the cassette body 46 as shown in FIG. 9, and elastic plates 78 and 79 are additionally provided therein in order to press the outermost peripheral surface of the roll of film 4. It is preferable that the film leader 4a be retained by the retaining claw 49 with the leading end of the film leader 4a protruded from the light shielding plate 48 as shown in FIG. 10. Furthermore, in the embodiment shown in FIGS. 20 and 21, an elastic member formed of a material such as the rubber or sponge 62-64 shown in FIG. 15 may be used as a film pressing member instead of the elastic plate.

Figure 22:
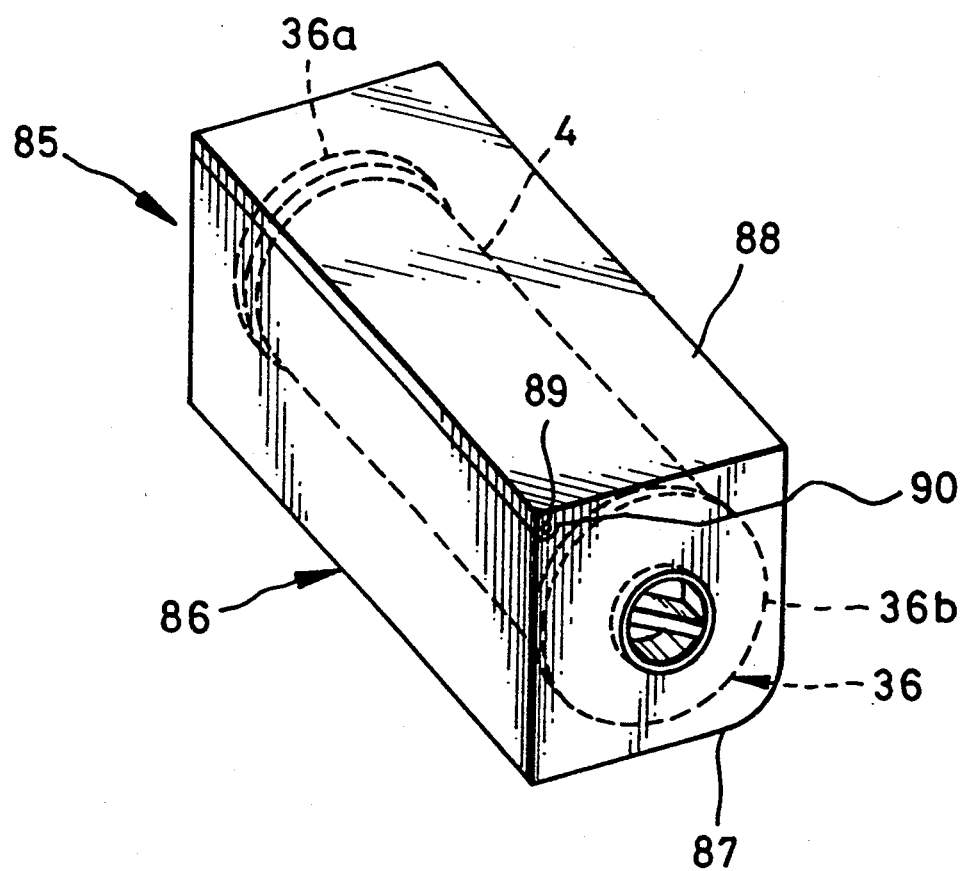
FIG. 22 shows a box-type film cassette with a cover member, of which the film roll contained therein is clamped between a pair of flanges.

FIG. 22 illustrates another embodiment of the invention. A box-type film cassette assembly 85 is shown. A cassette 86 is constituted of a cassette body 87 and an opening/closing cover member 88, and is formed of plastic having a light shielding ability. A spool 36 including deformed flanges 36a and 36b as shown in FIG. 6 is employed, and this spool 36 with the roll of film 4 wound thereon is contained in a light-tight manner within a cassette body 87. When the opening/closing cover member 88 is pivoted about a hinge 89, a film passage mouth 90 is formed between the cassette body 87 and the cover member 88. It is preferable that the film passage mouth 90 be provided with a retaining claw in order to retain the film leader in such a manner as to be sandwiched between the cassette body 87 and the cover member 88.

A camera employing this film cassette 85 is required to include a mechanism for opening and closing the opening/closing cover member 88. Also, in this embodiment, as the roll of film 4 is clamped between the flanges 36a and 36b, the film leader can be fed out from the film passage mouth 90 by means of rotation of the spool 36. At that time, since no obstacle is present in the film passage mouth 90, the film can be fed smoothly and the film strip will not suffer from scratches. Furthermore, as the cassette 86 completely blocks the film passage mouth 90, the light shielding plush can be excluded.

Figure 23:
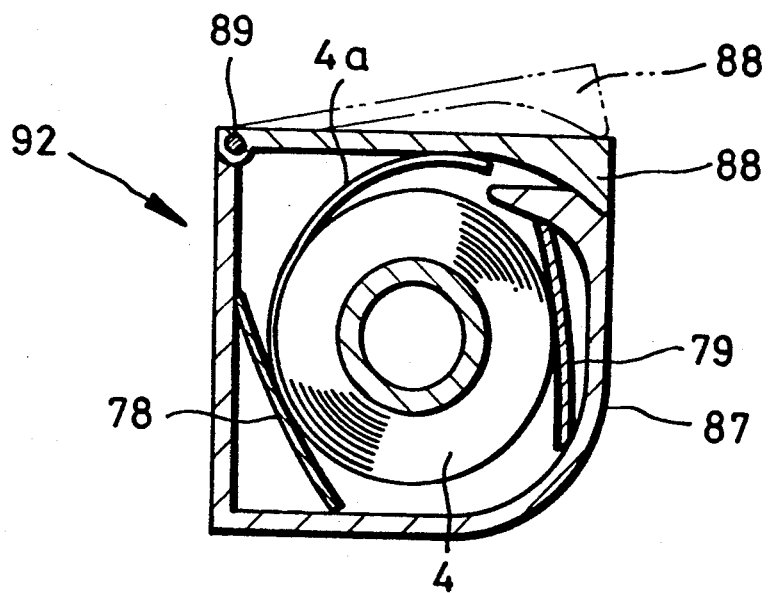
FIG. 23 shows a modified embodiment of the box-type film cassette with a cover member, in which the outermost peripheral surface of the roll of film is pressed with elastic plates.

A film cassette 92 of FIG. 23 uses the elastic plates 78 and 79 shown in FIG. 18 to press the outermost peripheral surface of the roll of film 4 instead of using the flanges of a spool for clamping the side edges of the outermost periphery of the roll of film 4. Of course, the elastic plate may be employed in addition to the flanges of the spool so that the roll of film 4 can be clamped between the flanges of the spool and pressed by the elastic plate to increase the reliability of the film ejection operation.

Since various changes and modifications of the invention will occur to and can be made readily by those skilled in the art without departing from the concept of the invention, the invention is not to be taken as limited to the specific embodiments except by the scope of the appended claims.

What is claimed is:

1. A photographic film cassette assembly having a spool for winding a photographic film in a roll in such a way that a back surface of the photographic film faces outwardly, said spool including a spool shaft, and a cassette for rotatably containing said spool therein and provided with a film passage mouth for passing said photographic film therethrough, said photographic film cassette assembly further comprising:

restricting means disposed within said cassette, for pressing an outermost circumferential peripheral surface of said roll of photographic film toward said spool shaft in order to prevent said roll of photographic film from being loose, a coefficient of friction between said restricting means and said back surface of said roll being smaller than a coefficient of friction between said back surface and a silver halide emulsion surface of said photographic film, wherein said restricting means is an elastic member mounted within said cassette.

2. A photographic film cassette assembly as claimed in claim 1, wherein said restricting means comprises a circumferential projection disposed within said cassette.

3. A photographic film cassette assembly, having a spool for winding a photographic film in a roll in such a way that a back surface of the photographic film faces outwardly, said spool including a spool shaft, and a cassette for rotatably containing said spool therein and provided with a film passage mouth for passing said photographic film therethrough, said photographic film cassette assembly further comprising:

restricting means disposed within said cassette, for pressing an outermost circumferential peripheral surface of said roll of photographic film toward said spool shaft in order to prevent said roll of photographic film from being loose, a coefficient of friction between said restricting means and said back surface of said roll being smaller than a coefficient of friction between said back surface and a silver halide emulsion surface of said photographic film, wherein said restricting means is an elastic member mounted within said cassette, wherein said elastic member comprises a rubber member, a sponge, or an elastic plate, and wherein said elastic member has a lubricant layer formed on its outer surface.

* * * * *